UNITED STATES PATENT OFFICE.

MARY E. MARCY, OF NEW HAVEN, CONNECTICUT.

IMPROVEMENT IN COSMETIC COMPOUNDS.

Specification forming part of Letters Patent No. 148,477, dated March 10, 1874; application filed February 6, 1874.

*To all whom it may concern:*

Be it known that I, MARY E. MARCY, of New Haven, in the county of New Haven and State of Connecticut, have invented a new, useful, and Improved Cosmetic Compound for the Skin; and I do hereby declare that the following is a full and exact description thereof.

This invention relates to that class of compounds used to beautify the skin; and the object of the invention is to make a preparation which shall not only be free from all articles which, by cutaneous absorption, may produce dangerous constitutional effects, but which shall produce a healthful action of the skin, while it improves its appearance. To this end all metallic salts, as white lead and the salts of bismuth are excluded from the preparation.

To enable others skilled in the art to make and use my improved compound, I will describe my method.

As ingredients, I take glycerine, one ounce; bay-rum, one-fourth of an ounce; essence of rose, one-fourth of an ounce; calcined magnesia, one-fourth of an ounce; soft or prepared chalk, two and one-half ounces; water, two ounces.

To make up my compound, I mix the chalk and magnesia together, and add the glycerine, and triturate them together until they are thoroughly mixed; I then add the bay-rum, essence of rose, and water, and again triturate until the whole mass becomes a homogeneous paste of the consistence of cream.

The proportions of the above-named ingredients may be slightly altered and still be within the range of my invention. The compound, as above prepared, is free from all injurious articles.

What I claim as my invention, and desire to secure by Letters Patent, is—

The compound hereinbefore described, of the materials and in the proportions mentioned, as a cosmetic.

MARY E. MARCY.

Witnesses:
 GEORGE TERRY,
 JULIUS TRIESS.